United States Patent
Pope (10) Patent No.: US 10,774,007 B2
(45) Date of Patent: Sep. 15, 2020

(54) FAST-DENSIFIED CERAMIC MATRIX COMPOSITE

(71) Applicant: Edward J. A. Pope, Westlake Village, CA (US)

(72) Inventor: Edward J. A. Pope, Westlake Village, CA (US)

(*) Notice: Subject to any disclaimer, the term of this patent is extended or adjusted under 35 U.S.C. 154(b) by 0 days.

(21) Appl. No.: 15/813,065

(22) Filed: Nov. 14, 2017

(65) Prior Publication Data

US 2018/0072631 A1    Mar. 15, 2018

Related U.S. Application Data

(62) Division of application No. 15/372,212, filed on Dec. 7, 2016, now Pat. No. 10,464,849.

(Continued)

(51) Int. Cl.
   *C04B 35/80* (2006.01)
   *C04B 35/575* (2006.01)
   (Continued)

(52) U.S. Cl.
   CPC .......... *C04B 35/645* (2013.01); *C04B 35/571* (2013.01); *C04B 35/573* (2013.01); *C04B 35/575* (2013.01); *C04B 35/6268* (2013.01); *C04B 35/62868* (2013.01); *C04B 35/62873* (2013.01); *C04B 35/806* (2013.01); *C04B 2235/3826* (2013.01); *C04B 2235/5244* (2013.01); *C04B 2235/5445* (2013.01); *C04B 2235/608* (2013.01); *C04B 2235/61* (2013.01);
   (Continued)

(58) Field of Classification Search
   CPC ... C04B 35/56; C04B 35/5607; C04B 35/565; C04B 35/573; C04B 35/575; C04B 35/5755; C04B 35/806
   See application file for complete search history.

(56) References Cited

U.S. PATENT DOCUMENTS

5,230,951 A * 7/1993 Birchall ................ C04B 35/634
                                                428/293.4
5,939,216 A * 8/1999 Kameda .................. C04B 35/08
                                                428/323

(Continued)

FOREIGN PATENT DOCUMENTS

EP     798281    * 10/1997
EP     926111    *  6/1999
(Continued)

OTHER PUBLICATIONS

U.S. Appl. No. 15/372,212 Non-Final Office Action, dated Jul. 25, 2018.

(Continued)

*Primary Examiner* — Karl E Group
(74) *Attorney, Agent, or Firm* — One LLP; Jonathan Jaech (57) ABSTRACT

A densified ceramic matrix composite (CMC) material densified CMC exhibits superior strength and toughness, relative to prior CMCs The material can be made by a process that includes impregnating a set of ceramic fibers with a non-fibrous ceramic material, resulting in a precursor matrix, stabilizing the precursor matrix, resulting in a stabilized matrix, and densifying the stabilized matrix using a frequency assisted sintering technology (FAST) process, resulting in the densified CMC material.

17 Claims, 8 Drawing Sheets

Related U.S. Application Data (60) Provisional application No. 62/264,814, filed on Dec. 8, 2015.

(51) Int. Cl.
*C04B 35/569* (2006.01)
*C04B 35/645* (2006.01)
*C04B 35/626* (2006.01)
*C04B 35/628* (2006.01)
*C04B 35/573* (2006.01)
*C04B 35/571* (2006.01)

(52) U.S. Cl.
CPC .. *C04B 2235/614* (2013.01); *C04B 2235/616* (2013.01); *C04B 2235/6567* (2013.01); *C04B 2235/66* (2013.01); *C04B 2235/666* (2013.01); *C04B 2235/77* (2013.01); *C04B 2235/96* (2013.01); *C04B 2237/083* (2013.01); *C04B 2237/32* (2013.01)

(56) References Cited

U.S. PATENT DOCUMENTS

| | | | | |
|---|---|---|---|---|
| 5,955,391 | A * | 9/1999 | Kameda | C04B 35/573 204/192.28 |
| 6,214,755 | B1 * | 4/2001 | Otsuki | C04B 35/575 264/682 |
| 6,576,076 | B1 * | 6/2003 | Tani | C04B 35/571 156/89.26 |
| 9,975,814 | B2 * | 5/2018 | Damjanovic | C04B 35/522 |
| 2005/0181192 | A1 * | 8/2005 | Steffier | B32B 18/00 428/293.4 |
| 2005/0276961 | A1 | 12/2005 | Sherwood et al. | |
| 2007/0042897 | A1 * | 2/2007 | Aihara | C04B 35/505 501/152 |
| 2007/0129233 | A1 * | 6/2007 | Ueno | B82Y 30/00 501/99 |
| 2008/0176735 | A1 * | 7/2008 | Ide | C04B 35/01 501/152 |
| 2009/0023577 | A1 * | 1/2009 | Oda | C04B 35/591 501/96.3 |
| 2010/0179051 | A1 * | 7/2010 | Citti | C04B 35/105 501/127 |
| 2010/0234207 | A1 * | 9/2010 | Shikata | C04B 35/14 501/128 |
| 2010/0248935 | A1 * | 9/2010 | Teratani | B32B 18/00 501/119 |
| 2012/0231243 | A1 * | 9/2012 | Watanabe | C04B 35/581 428/212 |
| 2012/0231945 | A1 * | 9/2012 | Watanabe | C04B 35/581 501/98.5 |
| 2014/0220338 | A1 * | 8/2014 | Lehtonen | A61L 27/10 428/357 |
| 2015/0246851 | A1 | 9/2015 | Miranzo et al. | |

FOREIGN PATENT DOCUMENTS

| | | | | |
|---|---|---|---|---|
| EP | 1028097 | A2 * | 8/2000 | C04B 35/573 |
| WO | WO-2013113944 | A1 * | 8/2013 | C04B 35/522 |

OTHER PUBLICATIONS

U.S. Appl. No. 15/372,212 Final Office Action, dated Feb. 8, 2019.
Gephard, S. et al., Advanced Manufacturing of Ceramic Matrix Composites (CMC) by Field Assisted Sintering Technology (FAST), Applied Research Laboratory, the Pennsylvania State University, https://nari.arc.nasa.gov/sites/default/files/SINGHJ-LEARN.pdf, retrieved Jul. 12, 2018.
Singh, J., Advanced Manufacturing of Ceramic Matrix Composites (CMC) by Innovative Field Assisted Sintering Technology (FAST), Pennsylvania State University, https://nari.arc.nasa.gov/sites/default/files/SinghJ_Report%20on%20Learn%20Phase%20I-Final-10-30-2014.pdf, retrieved Jul. 12, 2018.

* cited by examiner

FAST-DENSIFIED CERAMIC MATRIX COMPOSITE

CROSS REFERENCE TO RELATED APPLICATION

The present application is a divisional of application Ser. No. 15/372,212 filed Dec. 7, 2016, now U.S. Pat. No. 10,464,849, which claims priority under 35 U.S.C. § 119(e) to provisional application Ser. No. 62/264,814 filed Dec. 8, 2015, which applications are incorporated herein by reference in their entireties.

GOVERNMENT LICENSE RIGHTS

This invention was made with government support under contract N00014-13-P-1132 awarded by the Office of Naval Research (ONR). The government has certain rights in the invention.

FIELD

The present disclosure relates to methods and apparatus for fabricating ceramic matrix composites, and to the materials produced thereby.

BACKGROUND

Ceramic matrix composites (CMCs) combine a ceramic fiber (e.g., SiC) in a ceramic matrix (e.g., SiC). CMCs are useful for certain high-temperature applications, and may enable equipment to endure higher operating temperatures, which can be advantageous.

For example, hot section components have been manufactured from Ni-based super-alloys for commercial and military turbine engines. Through the past several decades, many advances in materials processing, composition, and design of metal components have led to steadily increased thermodynamic performance. To achieve further dramatic improvements, higher temperature non-metallic approaches need to be pursued and implemented. Experts in the field of turbine engines have concluded that ceramic matrix composites represent a breakthrough opportunity for improving turbine engine performance. It has been estimated that use of CMCs in the hot zone may simultaneously and substantially reduce $NO_x$ emissions, reduce specific fuel consumption (SFC), and increase engine thrust to weight ratios.

In pursuit of these and other benefits, turbine engine manufacturers have been investing in CMCs for turbine engine applications, both civilian and military. In addition to the benefits mentioned above, CMC components for turbine engines are believed to reduce engine weight, operate at temperatures as high as 2700° F., decrease containment requirements, and support inspection/replacement intervals as high as 6000 hours. CMCs are being considered for components such as low pressure turbine vanes and blades, high pressure turbine vanes, air seals, and combustors.

Figure 1:
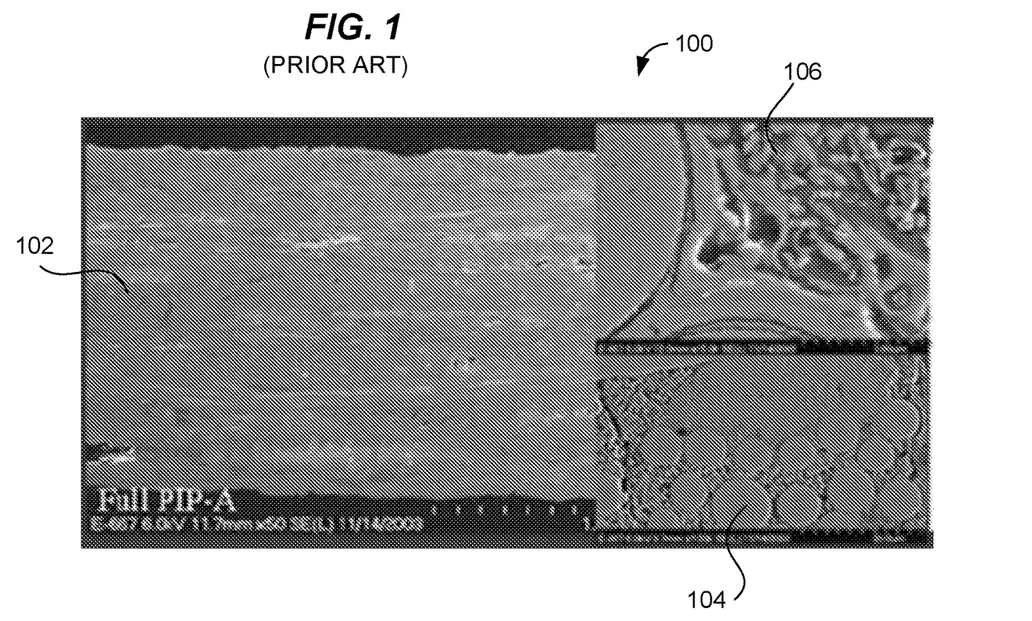
FIG. 1 is a set of electron microscope images showing cross sections of a prior art CMC made using polymer-impregnation-pyrolysis.
Figure 2:
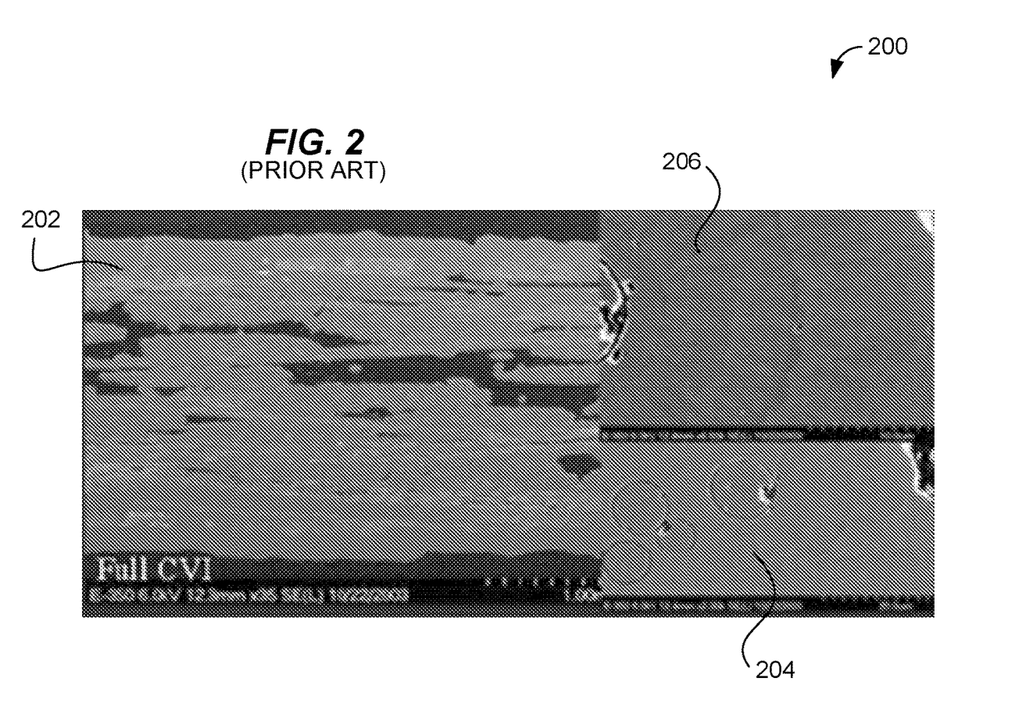
FIG. 2 is a set of electron microscope images showing cross sections of a prior art CMC made using chemical vapor infiltration.

Conventional CMC manufacturing methods have some significant drawbacks. The two most widely studied processes are chemical vapor infiltration (CVI) and polymer-impregnation-pyrolysis (PIP). As has been noted by others, there are inherent microstructural differences associated with the two processes. FIG. 1 shows electron-microscope images 100 of a PIP-fabricated CMC from the prior art. The image at left 102 shows a cross-section of the PIP-fabricated CMC taken parallel to the fiber grain. The images at right 104, 106 show cross-sections of the PIP-fabricated CMC taken perpendicular to the grain direction, with the upper image 106 at a higher magnification. The images show fine dispersed micro cracks and both closed and open porosity. FIG. 2 shows electron-microscope images 200 of a CVI-fabricated CMC from the prior art. The image at left 202 shows a cross-section of the CVI-fabricated CMC taken parallel to the fiber grain. The images at right 204, 206 show cross-sections of the CVI-fabricated CMC taken perpendicular to the grain direction, with the upper image 206 at a higher magnification. These images show that the CVI fabrication creates larger pockets of closed porosity relative to PIP, and generally no open porosity. These characteristics of PIP and CVI manufacturing lead to CMCs with less than optimal characteristics for strength and toughness.

Melt infiltration (MI) manufacturing of SiC/SiC CMCs has been investigated for many years. The process, for both carbon fiber preforms and later SiC fiber preforms was pioneered by BF Goodrich (now owned by United Technologies). The application of MI-SiC for turbine engines has been the subject of intense research by NASA and others. Some key considerations include residual stress retained in complex parts resulting from cooling of MI-SiC CMC parts. Additionally, retention of free silicon and free carbon has been an issue with the MI process, in which molten silicon is infiltrated into the fiber preform after it has been infused with a carbon source. Due to the high temperature of the process itself and lengthy heat treatment times, only a limited number of ceramic fibers are stable, such as Hi-Nicalon Type S and Sylramic, both forms of high temperature silicon carbide ceramic fibers.

It would be desirable, therefore, to develop new methods and technology that overcome these and other limitations of the prior art, for fabricating ceramic matric composites.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a method for making a ceramic matrix composite impregnating a set of ceramic fibers with a flowable pre-ceramic material, resulting in a precursor matrix, stabilizing the precursor matrix, resulting in a stabilized matrix, and densifying the stabilized matrix using a frequency assisted sintering technology (FAST) process, resulting in a densified ceramic matrix composite material.

In an aspect, the set of ceramic fibers may be, or may include a SiC fabric. The fabric may be a woven, braided, needle-punched, bundled, or non-woven material.

In another aspect, the method may further include coating the set of ceramic fibers with a layer of interface coating, prior to the impregnating. The interface coating may be selected from pyrolytic carbon (PyC) or boron nitride (BN).

The flowable pre-ceramic material may be, or may include, a preceramic polymer and the impregnation may include a polymer-impregnation-pyrolysis (PIP) process. In such case, the preceramic polymer may include added sub-micron SiC particulates. In an alternative, or in addition, the flowable pre-ceramic material may be, or may include, an organometallic gas and the impregnation may include a chemical vapor infiltration (CVI) process.

In an aspect, the precursor matrix is characterized by a low open porosity, for example, less than thirty percent, or less than ten percent. The stabilizing may include heat treating in an inert atmosphere or vacuum at a temperature in a range of 1400 C to 1700 C. For example, the stabilizing temperature may be 1600 C, or within 5% of 1600 C (e.g., 1600 C±80 C).

In another aspect, the FAST process is applied at a temperature in a range of 1600 C to 2000 C. For example, the stabilizing temperature may be 1800 C, or within 5% of 1800 C (e.g., 1800 C±90 C). In addition, the FAST process may be applied at a pressure in a range of 50 MPa to 150 MPa, for example, 100 MPa. The method may further include controlling the temperature of the FAST process by modulating an oscillating DC voltage applied through the stabilized matrix. The FAST process may be applied for a total time of less than 1000 seconds before terminating.

In an aspect, the FAST densified ceramic matrix composite material that results has a porosity of less than 5%. For example, the FAST densified ceramic matrix composite material may have a porosity of less than 1%.

The method described is believed to be the first CMC fabrication technique successfully using a FAST densification process to achieve a low porosity CMC. Although MI also produces low porosity CMS, MI is subject to other limitations pointed out in the "Background" above. Thus, the present technology provides the first FAST densified ceramic matrix composite material characterized by a porosity of less than 5%, for example, less than 1%. The FAST densified ceramic matrix composite may include a SiC fiber material in a ceramic SiC matrix. The FAST densified ceramic matrix composite material may include an interface coating, for example, a coating selected from pyrolytic carbon (PyC) or boron nitride (BN). The FAST densified ceramic matrix composite material may be characterized by a bulk density greater than 3 g/cm$^3$.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 3:
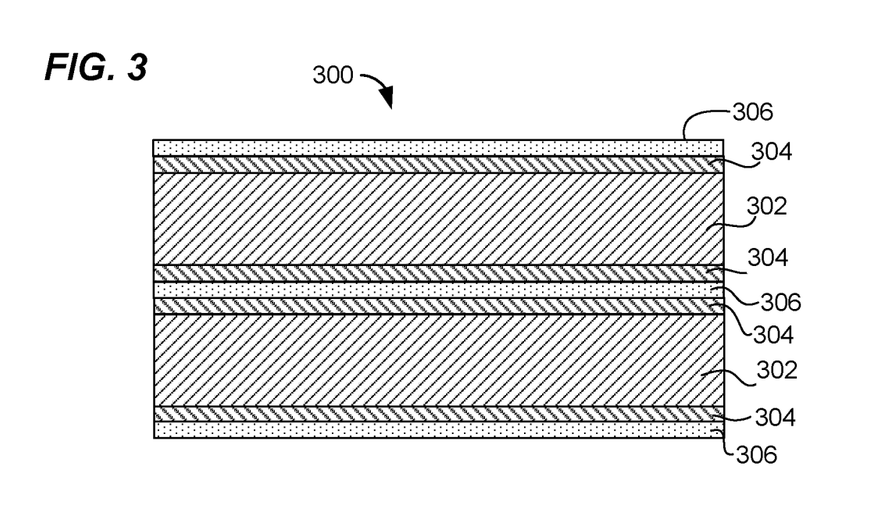
FIG. 3 is a schematic diagram illustrating structural components of a CMC.

Referring to FIG. 3, a CMC material 300 is diagrammed in cross-section parallel to its grain, after being produced by application of Frequency Assisted Sintering Technology (FAST) processing to the final densification of the ceramic matrix composite material 300. CMCs are typically composed of a fiber re-enforcement phase 302, an interface coating phase 304, and a ceramic matrix phase 306. The fiber re-enforcement phase 302 may be, or may include, a ceramic fiber, such as for example silicon carbide, or a carbon fiber. The fiber re-enforcement phase 302 may be processed into the CMC starting as a woven, braided, needle-punched, bundled, or non-woven material. The fiber re-enforcement phase 302 may be continuous or discontinuous.

The interface coating phase 304 on the surface of the fiber filaments may be, or may include, a carbon or ceramic material, such as boron nitride (BN). The CMC matrix phase 306 may be, or may include, a ceramic material, including but not limited to silicon carbide (SiC). The starting (or "precursor") matrix for forming the CMC should contain less than 30 percent open porosity, preferably less than 10 percent, prior to FAST processing. Applications for FAST-densified CMCs may include, but are not limited to, turbine engine components, nuclear reactor components, rocket or missile components, or any other structural component used at an extremely high temperature.

Frequency Assisted Sintering Technology (FAST), also known as Field Assisted Sintering Technology (FAST) or Spark Plasma Sintering (SPS): Once described as "hot pressing on steroids," frequency assisted sintering technology has diverse areas of application, including but not limited to net-shaped forming components, ceramic-metal joining, turbine components, thermo-electric materials, ultra-high temperature ceramic tiles, cutting tools, sensors, and body armor. Much research has been conducted throughout the world on this technology. The process can be applied to a wide range of materials, including glasses, ceramics, metals, and functionally graded materials. It has a process cycle time that is typically 70-80 times faster than most conventional methods. The FAST process is well suited for achieving high theoretical density net shaped components, which is important for turbine blades and vanes, among other things. Additionally, it is 20-33 percent more energy efficient than conventional methods, as the material is heated directly by its own electrical resistance to a current passed through it.

Figure 4:
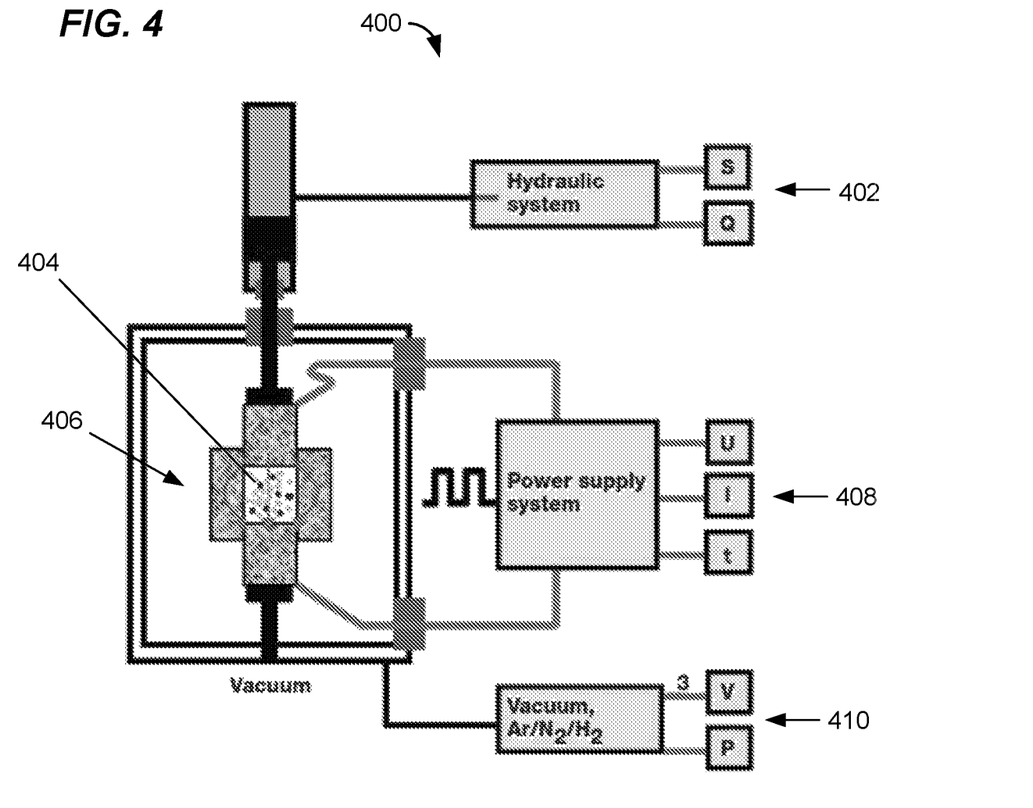
FIG. 4 is a schematic representation of an apparatus for applying a Frequency Assisted Sintering Technology (FAST) process to a material under treatment.

Referring to FIG. 4, a schematic representation of an apparatus 400 for applying a FAST process to a material under treatment is shown. The apparatus 400 may resemble a traditional hot press, but with much more sophisticated power supplies and temperature controls. The apparatus 400 may include a hydraulic system 402 to apply pressure to a material 404 being compresses in a cylinder 406 or other press component. A power supply system 408 provides electrical energy of a controlled voltage and frequency over a total time duration. The entire FAST process can be conducted in a controlled atmosphere, such as argon, or under vacuum, using a vacuum system 410.

Figure 5:
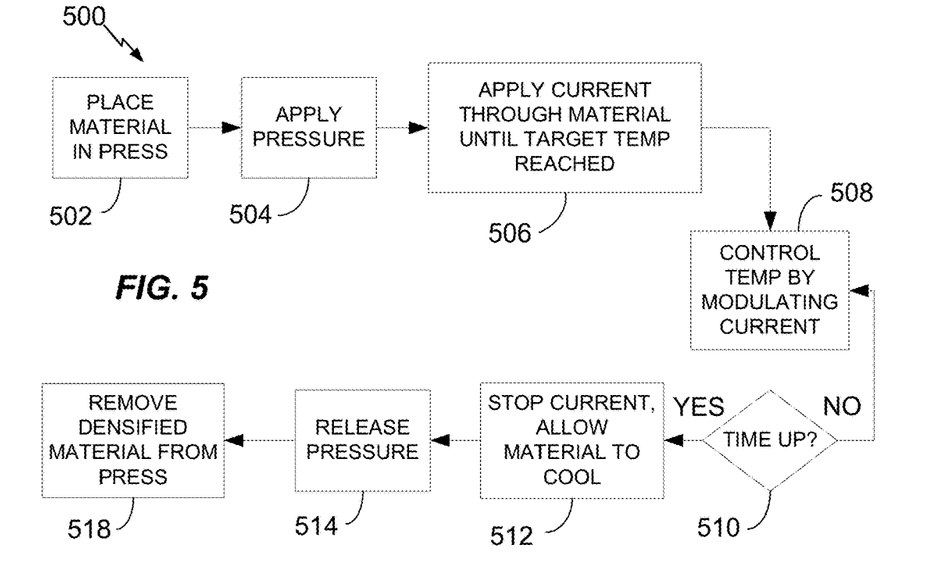
FIG. 5 is a flow chart diagraming a FAST process.

FIG. 5 is a flow chart diagramming a FAST process 500. At 502, a pretreated material is placed in a press. At 504, pressure is applied using a hydraulic piston or other suitable equipment, to the desired pressure level. At 506, an electric current (typically DC) is passed through the material in the press, causing heating by electrical resistance. The current is maintained until a targeted temperature if reached for the material under pressure, which may be monitored using a thermocouple or other temperature sensor attached to the press. At 508, the current is modulated to maintain the target temperature, while the pressure applied at 504 is also maintained. The pressure and temperature are maintained until a timer 510 indicates the treatment period is ended. At 512, the current is terminated, allowing the material to cool. At 514, the pressure being applied to the press is released. At 518, the press is opened, and the treated, densified material is removed.

Figure 6:
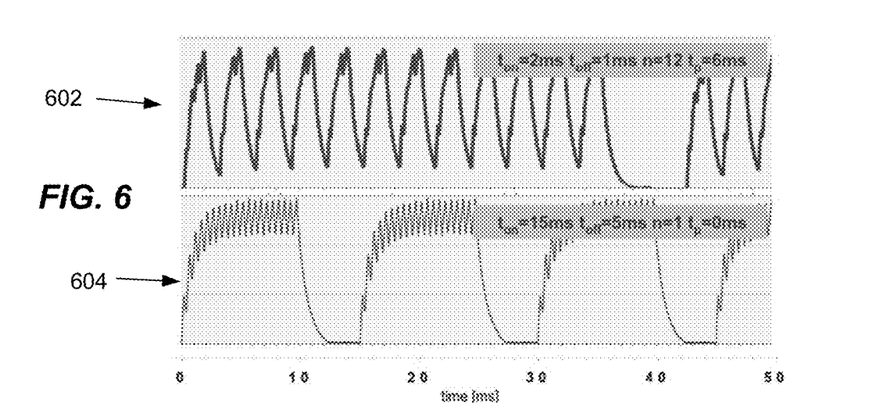
FIG. 6 illustrates examples of duty cycles for heating in a FAST process.

The power supply system 408 is capable of delivering a wide range of complex frequency duty cycles that can be optimized for the specific material system being processed, two of which are illustrated in FIG. 6. The base output is DC voltage that can be oscillated in one or more patterns 602, 604, depending on the desired temperature response and other factors.

Figure 7A:
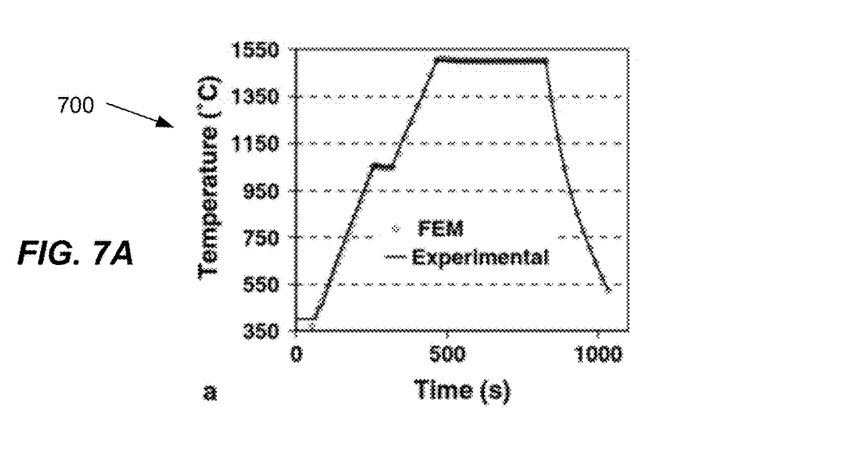
FIGS. 7A-D illustrate examples of time-temperature profiles for a FAST process lasting 1000 seconds or less.
Figure 7B:
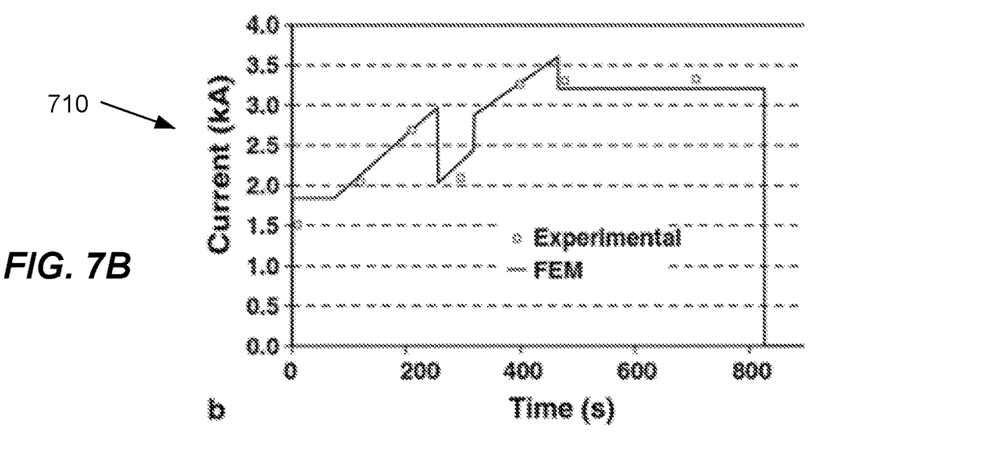
Figure 7C:
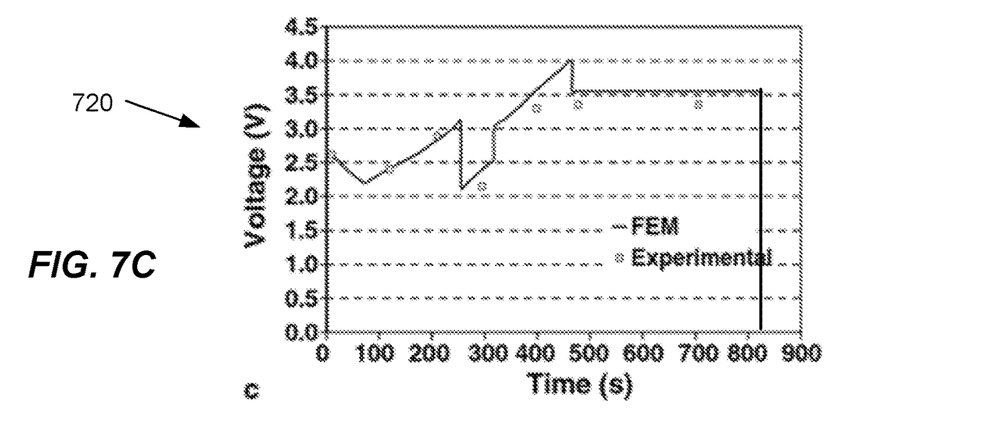
Figure 7D:
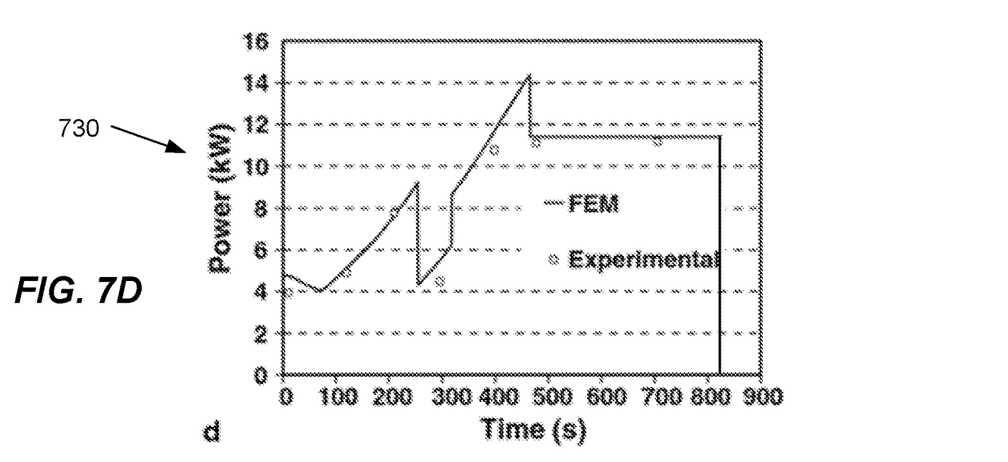

In order to achieve a desired temperature versus time profile, the current, voltage, and power outputs can be modulated accordingly, as shown in FIGS. 7A-D. FIG. 7A shows a temperature/time profile 700 for a FAST process. FIG. 7B shows a current/time profile 710, FIG. 7C shows a voltage/time profile 720, and FIG. 7D shows a power/time profile 730 for the same FAST process.

The application of FAST to CMC manufacturing has a number of attractive advantages relative to traditional CMC fabrication routes. Some of these advantages include: (A) It has a process cycle time that is typically 70-80 times faster than most conventional methods (minutes versus days or weeks); (B) It is well suited for achieving high theoretical density (>99%); (C) It is well suited for complex net shaped components, such as turbine blades and vanes!; (D) It is 20-33 percent more energy efficient than conventional methods, as the material itself is what's heated; and (E) Especially when conducted under vacuum, it is a high purity process. Hence, FAST processing of CMCs is a highly attractive alternative approach to lower cost, higher quality, and improved performance CMC manufacturing for 2700 F hot section turbine engine components.

Figure 8:
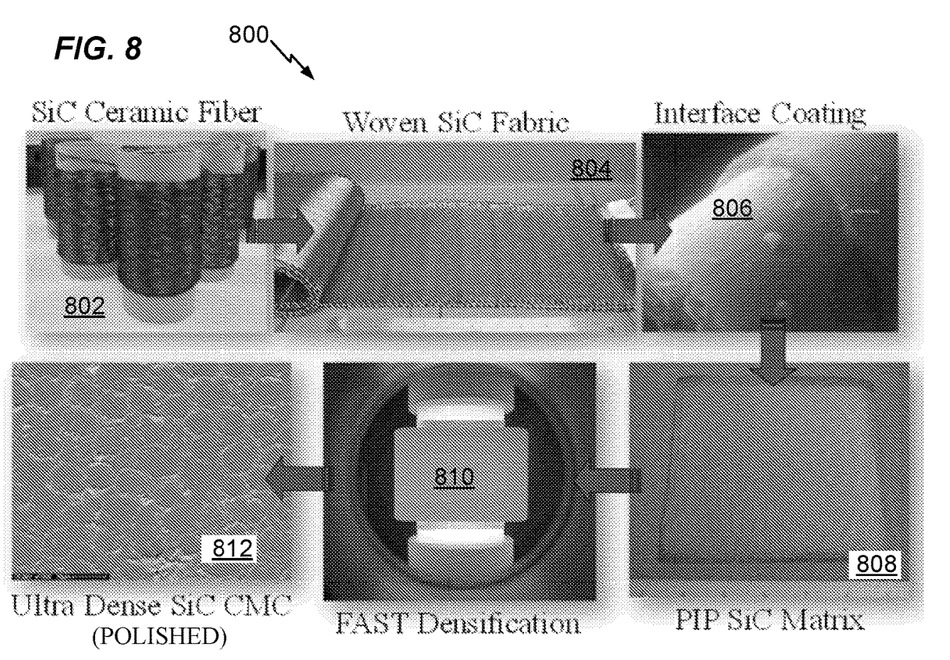
FIG. 8 is a flow chart illustrating a method for producing a densified CMC.

FIG. 8 shows a schematic representation of the "FAST CMC Process" 800. At 802, an input high temperature ceramic fiber, for example "Sylramic" silicon carbide (SiC) fiber manufactured by COIC (San Diego, Calif.) is obtained. At 804, the fiber is woven into ceramic fabric, for example 8 harness satin weave (8HSW). At 806, the fiber cloth is coated with a thin layer (100-2000 nm) of interface coating, such as pyrolytic carbon (PyC) or boron nitride (BN).

At 808, the interface coated cloth is then densified with a silicon carbide matrix phase by the polymer-impregnation-pyrolysis (PIP) method into a "precursor CMC." The pre-ceramic polymer employed for the PIP process was "Starfire" SMP-10 preceramic polymer. The goal of the PIP densification is to achieve an open porosity of less than 10 percent to facilitate successful FAST densification, although higher porosities (e.g., up to about thirty percent) may also be usable. The precursor CMC, typically processed at about 1200° C., is heat treated at 1600° C. in inert atmosphere (argon gas) to 1600° C. to stabilize it prior to FAST densification.

At 810, the FAST densification process is applied at a processing temperature of between 1600° C. to 2000° C., as described in more detail above. The FAST process results, at 812, in a densified SiC fiber/SiC matrix ceramic composite.

In Tables 1 and 2 shown below, the density and porosity is given for SiC/SiC CMC discs processed between 1600° C. to 2000° C. for 10 minutes under given pressures. One set of CMCs was processed by PIP without the addition of sub-micron SiC particulates (Table 1) and the other set of CMCs contained about 5 percent sub-micron SiC particulate filler. As can be readily seen, under both SiC particulate filled and unfilled, density increases and porosity decreases as a function of increased FAST processing temperature. Density is expressed in units of g/cm$^3$.

TABLE 1

Density and Porosity Data by Archimedes' Method for SPS (FAST) SiC/SiC CMC Discs (No SiC Particulate Filler).

| Sample | Temp (° C.) | Pressure (MPa) | $W_d$ | $W_{ss}$ | $W_s$ | Apparent Density | Bulk Density | % Porosity |
|---|---|---|---|---|---|---|---|---|
| A1-8 | 1600 | 100 | 1.4893 | 1.0609 | 1.6256 | 2.743 | 2.081 | 24.14 |
| A1-10 | 1700 | 100 | 1.8247 | 1.3261 | 1.915 | 2.887 | 2.445 | 15.33 |
| A1-6 | 1800 | 100 | 1.5196 | 1.1272 | 1.5321 | 3.055 | 2.961 | 3.09 |
| A1-7 | 1900 | 60 | 1.9171 | 1.4281 | 1.9205 | 3.093 | 3.072 | 0.69 |
| A1-9 | 2000 | 60 | 1.8441 | 1.3735 | 1.847 | 3.092 | 3.073 | 0.61 |

TABLE 2

Density and Porosity Data by Archimedes' Method for SPS (FAST) SiC/SiC CMC Discs (With SiC Particulate Filler).

| Sample | Temp | Pressure | $W_d$ | $W_{ss}$ | $W_s$ | Apparent Density | Bulk Density | % Porosity |
|---|---|---|---|---|---|---|---|---|
| B2-2  | 1600 | 100 | 1.5411 | 1.1374 | 1.6437 | 3.012 | 2.402 | 20.26 |
| B2-4  | 1700 | 100 | 1.0398 | 0.7723 | 1.0836 | 3.067 | 2.635 | 14.07 |
| B2-6  | 1800 | 100 | 1.347  | 1.0071 | 1.3659 | 3.127 | 2.962 | 5.27  |
| B2-20 | 1900 | 60  | 1.5826 | 1.1809 | 1.589  | 3.108 | 3.060 | 1.57  |
| B2-19 | 2000 | 60  | 1.4312 | 1.0755 | 1.4428 | 3.175 | 3.074 | 3.16  |

Figure 9:
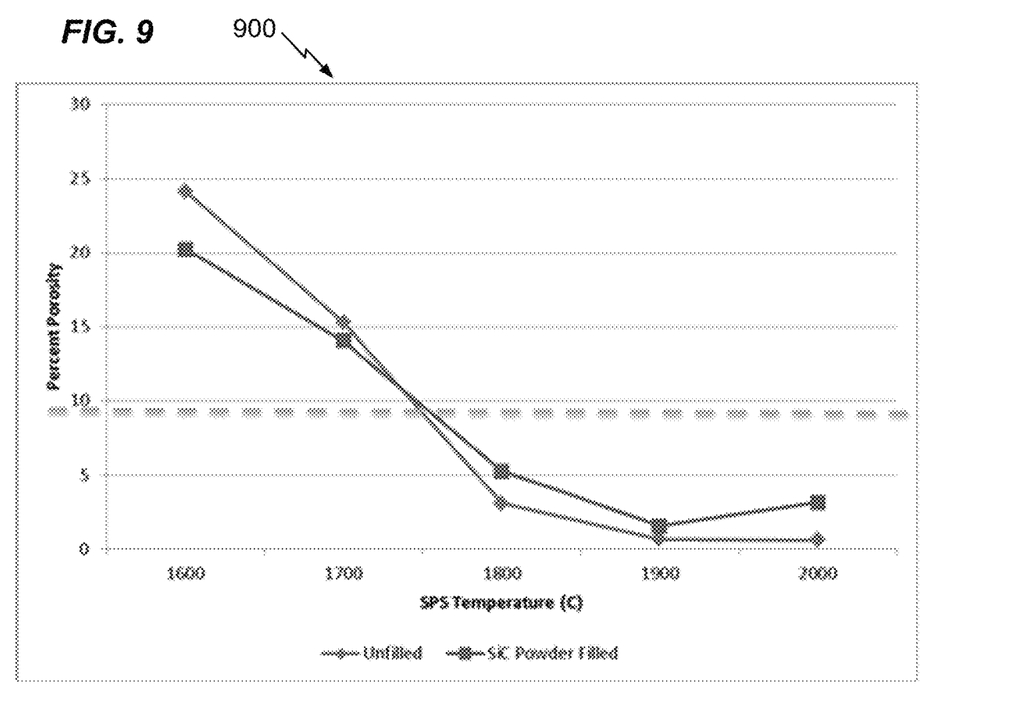
FIG. 9 is a chart illustrating porosity of the finished product versus FAST processing temperature.

FIG. 9 shows a chart 9000 in which the percent open porosity of the final CMC product is plotted versus the FAST processing temperature. The horizontal dashed line indicates the typical minimum percent porosity achievable by either conventional PIP or CVI densification processes. By applying the FAST process, a nearly zero percent porous CMC is demonstrated, especially for the unfilled precursor CMCs, much lower than achievable using conventional state-of-the-art CMC manufacturing techniques.

Figure 10:
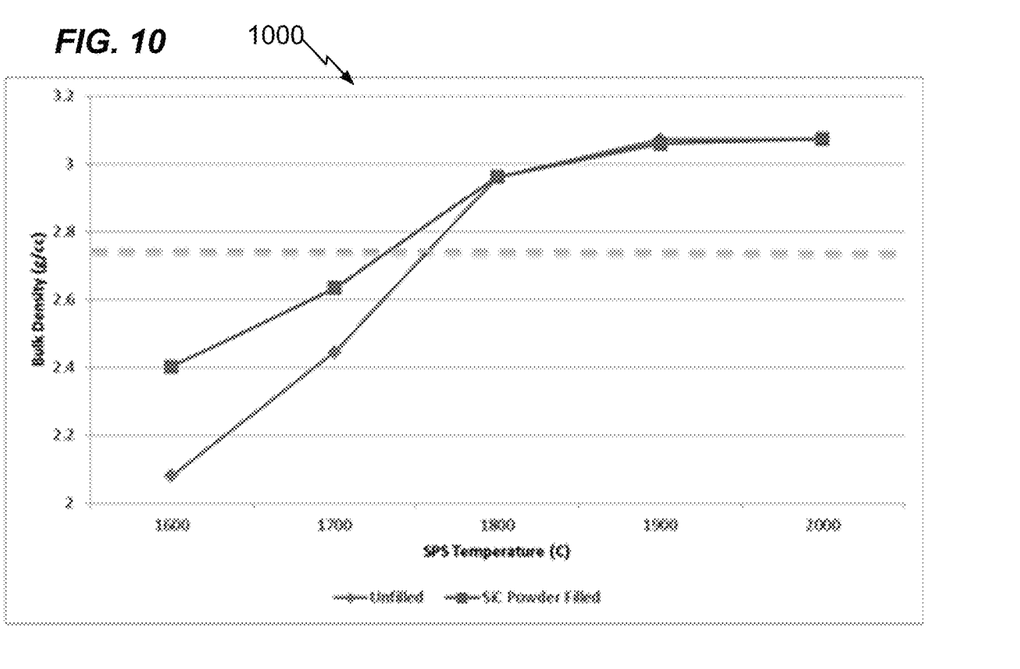
FIG. 10 is a chart illustrating porosity of the finished product versus FAST processing temperature.

FIG. 10 shows a chart 1000 in which the bulk density of the FAST CMCs product is plotted versus FAST processing temperature. The horizontal dashed line represents the typical maximum bulk density achievable using conventional state-of-the-art CMC manufacturing techniques, such as PIP and CVI, corresponding to approximately 2.7 grams/cc. In FAST densified CMCs, bulk densities of nearly 3.1 grams/cc have been demonstrated.

The finished CMC products produced using the method parameters indicated herein were tested for various properties. The tests results demonstrated that FAST (SPS) processing can be applied to final CMC densification to achieve low porosity and high density, evidence of CMC fracture behavior and fiber pull out, and a SiC/SiC CMC with undetectable oxygen contamination (or any other contaminants). Table 3 illustrates desirable properties of the densified CMCs that can be produced using the methods disclosed herein. A FAST processing temperature of 1800° C. resulted in the most optimal characteristics overall, at least for FAST processing conditions of 10 minutes at 60 MPa applied pressure.

TABLE 3

Desirable Properties for SPS-Processed Unfilled SiC/SiC CMCs

| SPS Processing Temperature (° C.) | Low Porosity & High Density | CMC Fracture Behavior & Fiber Pullout | SiC With No Detectable Oxygen Contamination |
|---|---|---|---|
| 1600 | No  | Yes | No  |
| 1700 | No  | Yes | No  |
| 1800 | Yes | Yes | Yes |
| 1900 | Yes | No  | Yes |
| 2000 | Yes | No  | Yes |

Figure 11:
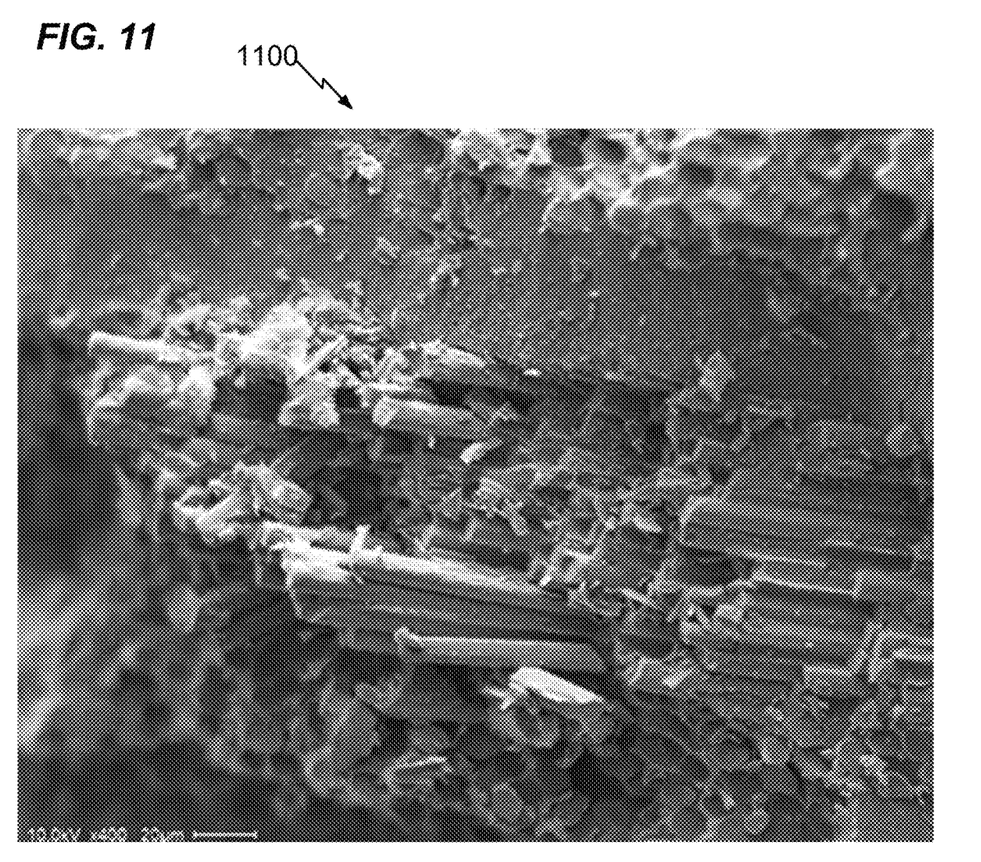
FIGS. 11-13 are scanning electron microscope (SEM) images each showing a fracture surface of a densified SiC/SiC CMC processed using FAST at 1800 C, without SiC particulate filler.
Figure 12:
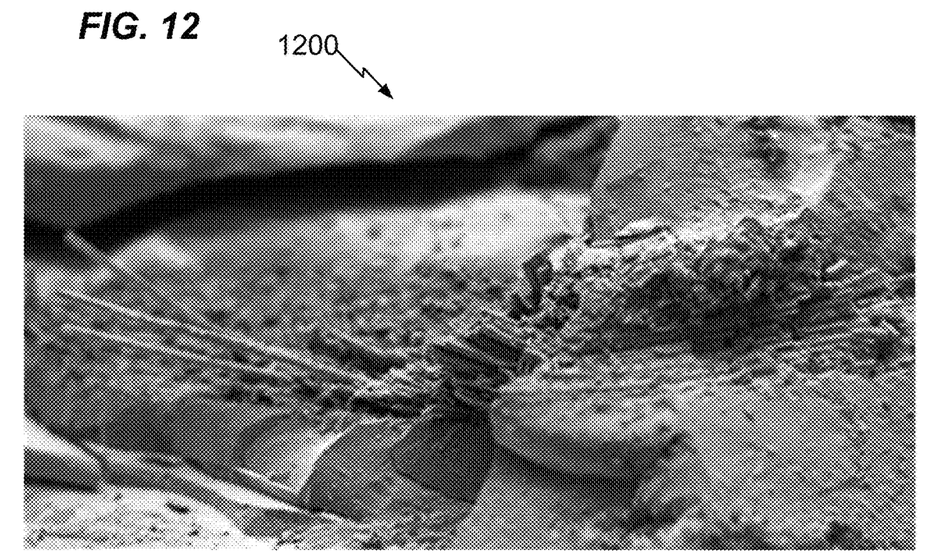
Figure 13:
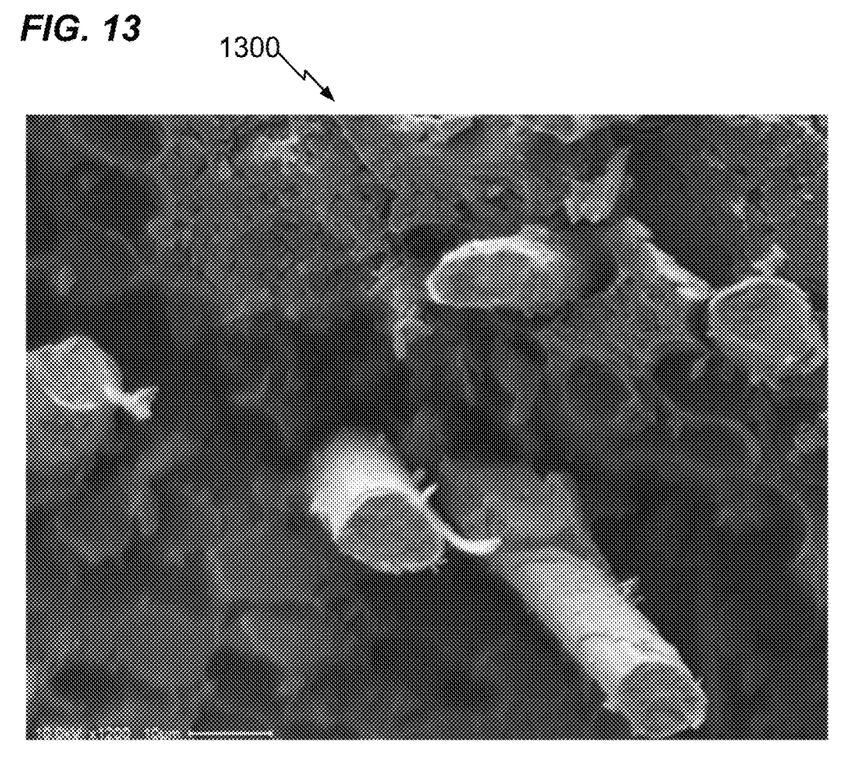

FIGS. 11-13 are scanning electron microscope (SEM) images 1100, 1200, 1300 each showing a fracture surface of a densified SiC/SiC CMC processed using FAST at 1800° C., without SiC particulate filler. The matrix of the CMCs are quite dense and fiber pull-out—a desirable property correlated to material strength and toughness—is evident. In FIG. 13, the ~400 nm PyC interface coating on the protruding SiC fibers is readily discernable. Overall, the fractography shows excellent CMC fracture behavior under these FAST/SPS processing conditions.

As part of its "Defense Wide Manufacturing Science and Technology Program," the Office of the Secretary of Defense (OSD) has separately identified both CMCs and FAST (Field Assisted Sintering Technology) as key areas of interest. This technology integrates these two OSD identified manufacturing science and technology focus areas In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, all illustrated blocks are not necessarily required to implement the methodologies described herein.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A ceramic matrix composite material consisting essentially of a structure of continuous ceramic fibers encapsulated in a matrix consisting essentially of ceramic SiC, wherein the ceramic matrix composite material is characterized by an open porosity of less than 5%.

2. The ceramic matrix composite material of claim 1, wherein the structure of continuous ceramic fibers consists essentially of SiC fibers.

3. The ceramic matrix composite material of claim 1, wherein the structure of continuous ceramic fibers consists essentially of C fibers.

4. The ceramic matrix composite material of claim 1, characterized by an open porosity of less than 1%.

5. The ceramic matrix composite material of claim 1, characterized by an open porosity of less than 3%.

6. The ceramic matrix composite material of claim 1, comprising, on ceramic fibers of the densified ceramic matrix composite material, an interface coating selected from pyrolytic carbon (PyC) or boron nitride (BN).

7. The ceramic matrix composite material of claim 1, characterized by a bulk density greater than 3 g/cm$^3$.

8. The ceramic matrix composite material of claim 1, wherein the continuous ceramic fiber structure is selected from a woven, braided, needle-punched, bundled, or non-woven material.

9. The ceramic matrix composite material of claim 8, wherein the structure of continuous ceramic fibers comprises a fabric.

10. The ceramic matrix composite material of claim 2, characterized by an open porosity of less than 1%.

11. The ceramic matrix composite material of claim 2, characterized by an open porosity of less than 3%.

12. The ceramic matrix composite material of claim 2, consisting of the SiC fibers, the ceramic SiC matrix and an interface coating for the SiC fibers selected from pyrolytic carbon (PyC) or boron nitride (BN).

13. The ceramic matrix composite material of claim 12, characterized by an open porosity of less than 1%.

14. The ceramic matrix composite material of claim 12, characterized by an open porosity of less than 3%.

15. The ceramic matrix composite material of claim 3, characterized by an open porosity of less than 1%.

16. The ceramic matrix composite material of claim 3, characterized by an open porosity of less than 3%.

17. The ceramic matrix composite material of claim 3, consisting of the C fibers in the ceramic SiC matrix and an interface coating for the C fibers selected from pyrolytic carbon (PyC) or boron nitride (BN).

* * * * *